United States Patent [19]  
Cooper

[11] 4,257,181  
[45] Mar. 24, 1981

[54] FISHING ROD HOLDER  
[76] Inventor: William A. Cooper, 804 Leverton Rd., Rockville, Md. 20852  
[21] Appl. No.: 63,772  
[22] Filed: Aug. 6, 1979  
[51] Int. Cl.³ ............................................. A01K 97/10  
[52] U.S. Cl. ..................................... 43/21.2; 248/530  
[58] Field of Search .......................... 43/21.2, 54.5 R; 248/530, 532, 533

[56] References Cited  
U.S. PATENT DOCUMENTS

| | | | |
|---|---|---|---|
| 1,952,789 | 3/1934 | Butts | 248/533 |
| 2,564,065 | 8/1951 | Jaden | 248/533 |
| 2,971,734 | 2/1961 | Grimes | 248/533 |
| 3,021,101 | 2/1962 | Gliebe | 248/532 |
| 3,339,869 | 9/1967 | Andersen | 248/532 |
| 3,870,259 | 3/1975 | Reynolds | 43/21.2 |
| 4,007,902 | 2/1977 | Pettee | 248/530 |

FOREIGN PATENT DOCUMENTS 864930 7/1968 Canada ................................... 43/21.2

Primary Examiner—Nicholas P. Godici  
Attorney, Agent, or Firm—L. S. Van Landingham, Jr.

[57] ABSTRACT

The present invention provides an improved fishing rod holder which is especially useful for holding and tending a fishing rod when surf fishing from a sandy beach, or when fishing from an earthen shoreline. The invention also provides an inexpensive method of producing the fishing rod holder of the invention from readily available materials.

9 Claims, 8 Drawing Figures

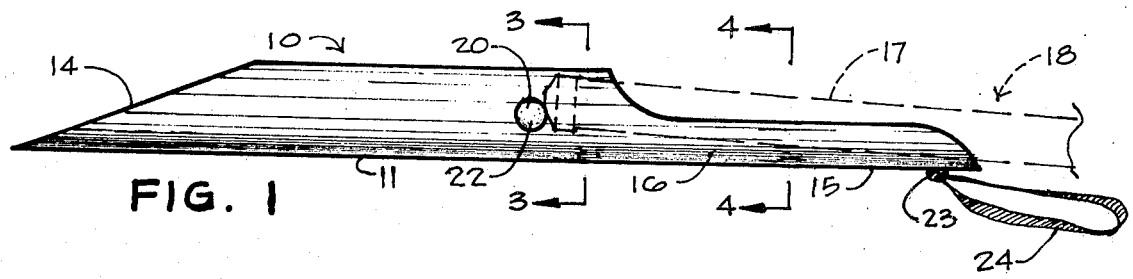
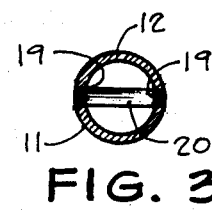
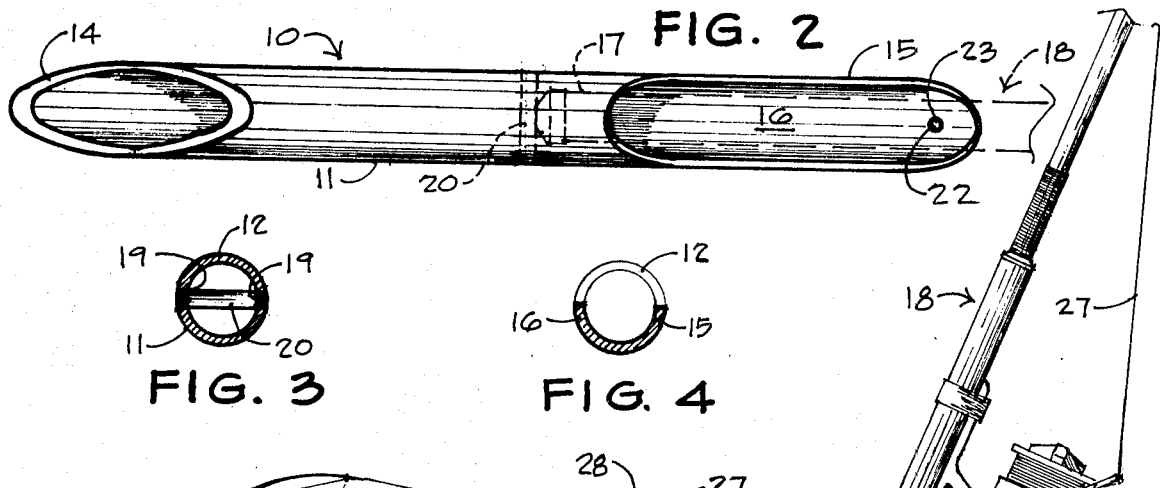
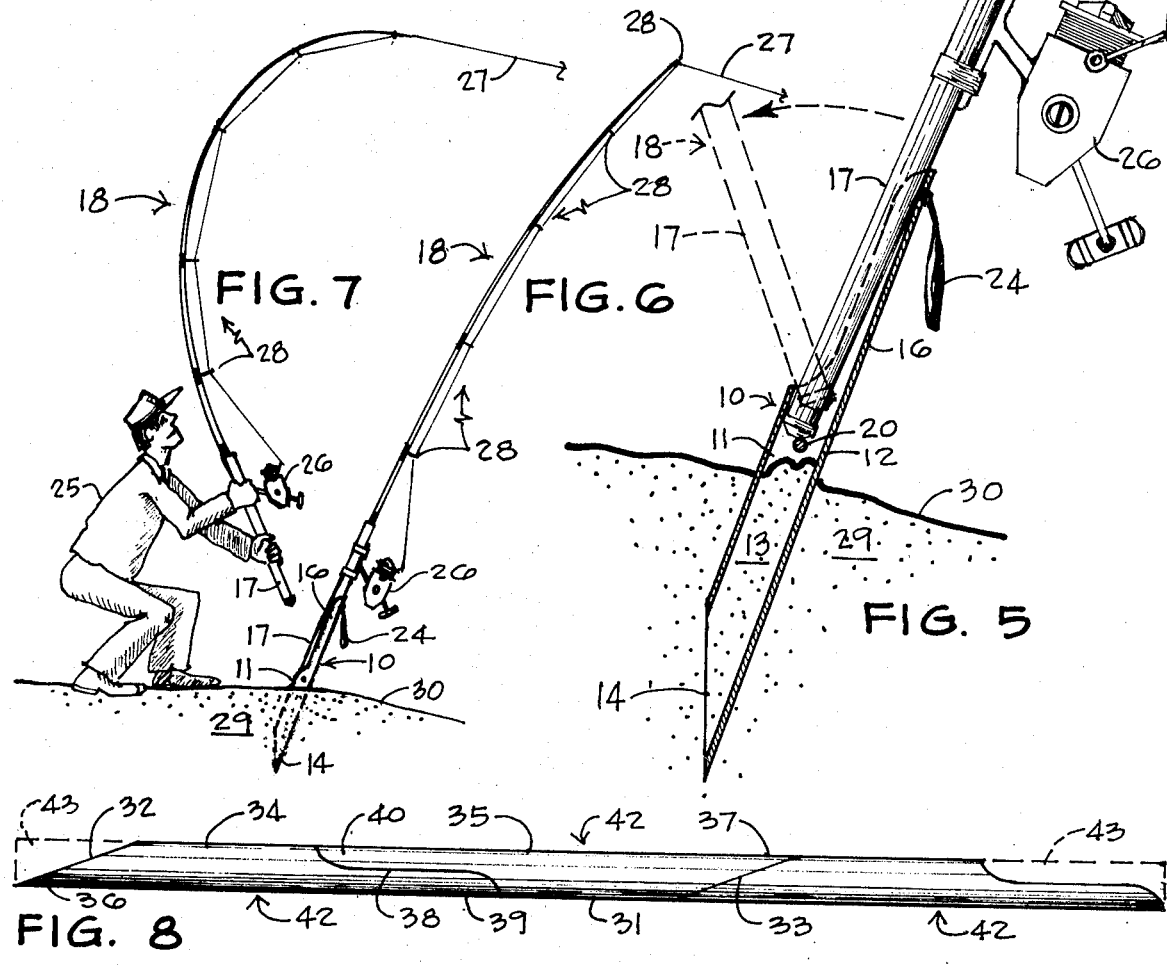

4,257,181

FISHING ROD HOLDER

THE BACKGROUND OF THE INVENTION

1. The Field of the Invention

This invention is broadly related to holders for fishing rods. In one of its more specific embodiments, the present invention is concerned with an improved fishing rod holder which is especially useful for holding and tending a fishing rod and reel when surf fishing from a sandy beach, or when fishing from an earthen shoreline. The invention is also concerned with a novel method of producing the fishing rod holder of the invention.

2. The Prior Art

A wide variety of fishing rod holders have been proposed heretofore. However, in general the prior art fishing rod holders have one or more serious deficiencies and thus are not entirely satisfactory in all respects.

For example, it is recognized by skilled fisherman that a fishing rod should be pulled up and straight back from the general direction of the attached fishing line immediately upon getting a strike, i.e., at the time that a fish takes the baited hook and attempts to swim away therewith. This action must be taken very quickly in order to set the hook and thus catch the striking fish before it senses danger. It is also very desirable to maintain a taut fishing line after setting the hook, and thereby prevent the fish from throwing the hook and escaping. There usually is no problem in these respects in instances where an avid experienced fisherman holds the fishing rod directly in his hands.

In instances where the fisherman tires after an extended period of vigorous fishing or otherwise desires to give little or no attention to the fishing rod, it is common practice to use a prior art fishing rod holder to hold and tend the fishing rod. As a general rule, the prior art fishing rod holders are not capable of holding and tending a fishing rod in a proper fishing position with little or no attention until obtaining a strike, and then allow the fisherman to immediately and rapidly pull up and back on the fishing rod to thereby quickly set the hook without giving warning to the striking fish.

The prior art fishing rod holders also do not have a combination of desirable secondary features. For example, as a general rule they are not strong and durable, light in weight, easily portable from fishing site to fishing site, and of a unitary construction which eliminates the possibility of losing one or more pieces when moving frequently on a fishing trip. The prior art fishing rod holders also do not permit a wide degree of flexibility when fishing in both fresh and salt water.

As a result of the foregoing and still other deficiencies well known to those skilled in this art, fishermen have long sought an entirely satisfactory fishing rod holder. However, one has not been available prior to the present invention in spite of the long standing need therefor.

THE SUMMARY OF THE INVENTION

The present invention overcomes the aforementioned and other disadvantages of the prior art by providing an improved fishing rod holder which is capable of securely holding and tending a fishing rod in a proper fishing position while awaiting a strike, and with little or no close attention from the fisherman. However, upon getting a strike, the construction of the fishing rod holder is such as to allow the fisherman to immediately and rapidly pull up and back on the fishing rod to thereby quickly set the hook without giving warning to the fish feeding on the bait. Additionally, the construction of the fishing rod holder is such that the rapid pull on the rod in setting the hook also maintains the fishing line taut initially, and it is thereafter possible to easily maintain the fishing line taut and thereby prevent the fish from throwing the hook and escaping. The foregoing is achieved in a unitary construction for the fishing rod holder which eliminates the possibility of losing one or more components thereof. The construction is strong and durable, and yet light in weight whereby the fishing rod holder is easily portable. The aforementioned construction also provides a fishing rod holder having a wide degree of flexibility in both fresh and salt water fishing. The construction of the fishing rod holder is also such that it may be produced easily from an elongated plastic or metal tube-like member, or from an equivalent tube-like stock material. Thus, the fishing rod holder is relatively inexpensive to manufacture and may be sold at a reasonable cost.

It is therefore one important object of the present invention to provide an improved fishing rod holder having the aforementioned advantages which is equally useful for holding and tending a fishing rod when surf fishing in salt water from a sandy beach, and when fishing in fresh water from an earthen shoreline.

It is a further object of the present invention to provide a novel method of manufacturing the fishing rod holder of the invention.

The accompanying illustrative drawings, and the following detailed description of the preferred embodiments and variants of the invention may be referred to for additional objects of the invention and a more complete and comprehensive understanding thereof.

THE BRIEF DESCRIPTION OF THE ACCOMPANYING DRAWINGS

The invention will be described hereinafter in greater particularity with reference to the accompanying drawings, wherein:

FIG. 1 is a side view in elevation of one presently preferred embodiment of the fishing rod holder of the invention, with the butt end of a fishing rod being shown therein in phantom line;

FIG. 2 is a top view of the fishing rod holder of FIG. 1;

FIG. 3 is a cross sectional view taken along the lines 3—3 of FIG. 1;

FIG. 4 is a cross sectional view taken along the lines 4—4 of FIG. 1;

FIG. 5 is a longitudinal cross sectional view in elevation illustrating the fishing rod holder of the invention inserted in soil and/or sand, with the butt end of a fishing rod being inserted therein and the fishing rod being held in a proper fishing position, and with the position assumed by the fishing rod when quickly moved to the strike position being further illustrated in phantom line;

FIG. 6 is a view in elevation further illustrating the use of the fishing rod holder for holding a fishing rod in a proper position while awaiting a strike;

FIG. 7 is a side view in elevation illustrating the position assumed by the fishing rod of FIG. 6 when quickly moved to the strike position; and FIG. 8 is a side view in elevation illustrating the method of the invention for preparing the fishing rod holder illustrated in FIGS. 1-6 from an elongated tubular member.

The aforementioned eight Figures of the drawings are referred to and discussed hereinafter in greater detail.

THE DETAILED DESCRIPTION OF THE INVENTION INCLUDING THE PRESENTLY PREFERRED VARIANTS AND EMBODIMENTS THEREOF

Referring now to FIGS. 1-6 of the drawings, which illustrate one presently preferred embodiment of the invention, the fishing rod holder generally designated as 10 includes an elongated hollow or tube-like body portion 11 having an annular wall 12 which encloses a longitudinally extending cavity 13. The lower end portion 14 of annular wall 12 is tapered at an acute angle and terminates in a sharp spike-like point. The upper end portion 15 of annular wall 12 is cut away on one side to form a generally semi-annular support 16 for the butt end portion 17 of fishing rod 18. The wall 12 has a pair of aligned openings 19 therein which receive pin 20 20, and the pin 20 limits the downward movement of butt end portion 17.

The outer end of the semicircular support 16 has an opening 22 formed therein for receiving an attaching or retaining means 23 for the carrying strap 24. As is best seen in FIGS. 5, 6 and 7, the fishing rod 18 is provided with a prior art reel 26 and a fishing line 27 is wound on the spindle thereof. The fishing line 27 is passed from reel 26 through eyes 28 on fishing rod 18, and then extends outward therefrom. As is well understood in this art, the end of fishing line 27 is provided with one or more conventional fishing hooks, weights, floats, and the like (not shown), and the hook or hooks are provided with a suitable bait for the prey sought by the fisherman.

As is best seen in FIG. 5, the pin 20 is positioned adjacent the semi-annular support 16 and is sufficiently remote therefrom for the resultant portion of the internal cavity 13 between the semi-annular support 16 and the pin 20 to receive and retain the terminal end of butt end portion 17 while awaiting a strike. Also, the internal cavity 13 has a diameter substantially larger than the diameter of the terminus of butt portion 17, thereby allowing it to rest against the internal side of the annular wall 12 which is remote from the semi-annular support 16 while the fishing rod 18 is in the fishing position and awaiting a strike. As is best seen in FIGS. 1, 2 and 5, the pin 20 limits the depth to which butt end portion 17 may be inserted into cavity 13 to a distance not greater than the internal diameter of cavity 13 between the pin 20 and the semi-annular support 16. The terminus of butt end portion 17 is then forced toward the internal side of the annular wall 12 which is generally opposite thereto when the fishing rod is moved quickly to the strike position.

As shown in phantom line in FIG. 5, the internal upper end of annular wall 12 serves as a fulcrum when the fishing rod 18 is moved rapidly to the strike position. Also, the internal upper end of semi-annular support 16 serves as a fulcrum for the fishing rod 18 when in the fishing position illustrated in solid line. Additionally, the surface of particulate material 30, under the longitudinal centerline of semi-annular support 16, serves as a fulcrum for the fishing rod holder 10. The forces are applied at the three fulcrums in the same general plane, i.e., in a plane passing through the longitudinal axis of the tubular body 11 which also bisects the lower end portion 14 and the semi-annular support 16 into two longitudinally extending equal parts. The forces applied at the three fulcrums tend to push downward on the angularly disposed portion of the fishing rod holder 10 above surface 30, and the tapered lower end portion 14 tends to be forced upward. Under these conditions, the concave surface of the lower end portion 14 has an upward shovel-like action which increases the stability of the fishing rod holder 10 very substantially. The fishing rod holder 10 is preferably inserted into the particulate material 29 at an angle whereby the tapered surface on the lower end of portion 14 lies in a vertical plane which forms a 90° angle with a plane passing through the horizon, and thus the tapered surface lies on a plumb line which is independent of the irregular surface 30. This critical angle at which the fishing rod 10 is inserted into the particulate material 30 greatly increases the stabilizing or "shovel-effect" of the tapered lower end portion 14. Finally, the cavity 13 preferably has a volume between the pin 20 and the lower end portion 14 which is sufficiently large to contain at least enough particulate material 29 to counterbalance the weight of the fishing rod 18. In view of the foregoing, the fishing rod 10 has a combination of unobvious stabilizing features which greatly increase the overall effectiveness thereof.

The lower end portion 14 is tapered outward from the annular wall 12 to form an acute angle of approximately 15° to 30°, and preferably about 20°, with a horizontal plane passing through the longitudinal axis of the tube-like body 11. This angle is of critical importance, as it determines the preferred angle at which the fishing rod holder 10 is inserted into particulate material 29. Within the range of 15° to 30°, regardless of the specific angle at which the lower end portion 14 is tapered, the fishing rod holder 10 is inserted into the particulate material 29 at an angle whereby the tapered surface lies in a vertical plane as previously described.

Inasmuch as the lower end portion 14 is an extension of the annular wall 12 and is tapered outward therefrom at the aforementioned angle to form an elongated pointed or spike-like lower end portion, and inasmuch as the semi-annular support 16 is an outward extension from one side of the upper end of annular wall 12 and has a semi-annular cross section, it is apparent that critical relationships exist therebetween. For example, the tapered lower end portion 14 and the semi-annular support 16 extend outward from the same longitudinally extending portion of the annular wall 12 whereby the concave internal surfaces thereof face in the same general direction and a vertical plane passing through the longitudinal axis of the annular wall 12 and bisecting the tapered lowered end 14 to form two longitudinally and outwardly extending substantially equal portions thereof, also bisects and semi-annular support 16 to form two longitudinally and outwardly extending substantially equal portions thereof.

In addition to the foregoing, as is best seen in FIGS. 2 and 4 the semi-annular support 16 has a cross sectional configuration such that the maximum width thereof is between the longitudinally extending side edges thereof, whereby the fishing rod 18 resting therein may be pulled rapidly upward and backward therefrom when a fish strikes without being obstructed. As is best seen in FIGS. 1, 2 and 4, the upper side edges of semi-annular support 16 do not extend upward past a horizontal plane passing through the longitudinal axis of annular wall 12 when it has a circular cross sectional configuration, and thus the upper side edges form the widest portion.

The above described cross sectional configuration of the semi-annular support 16, and especially when taken in combination with the fulcrum-like action illustrated in FIG. 5 of the upper edge of annular wall 12 adjacent thereto, assures that the fishing rod 18 in the rest or fishing position illustrated in solid line may be grasped initially with one hand by the fisherman 25 and immediately pulled up and straight back to the position illustrated in phantom line in FIG. 5 without any interference whatsoever from the fishing rod holder 10. This immediate action assures that once a strike is obtained, the hook may be quickly set without giving warning to the striking fish. The construction of the fishing rod holder is such that the rapid pull upward and backward on the fishing rod to the position illustrated in phantom line in FIG. 5 also maintains the fishing line taut initially, and thereafter it is possible to maintain the fishing line taut and thereby prevent the fish from throwing the hook and escaping as illustrated in FIG. 7.

The hollow tube-like body 11 is preferably circular in cross section, but it also may have other suitable hollow cross sectional configurations such as oval, rectangular, square and the like which are referred to generically herein as being "tube-like". When the tube-like body 11 is circular in cross section, the annular wall 12 is cylindrical in configuration, the longitudinally extending side edges of the semi-annular support 16 do not extend past a horizontal plane which passes through the longitudinal axis of the annular wall 12, and the horizontal plane forms a 90° angle with a vertical plane passing through the longitudinal axis of the annular wall 12 which bisects the tapered lower end 14 and the semi-annular support 16. The carrying strap 24 is preferably attached whereby the aforementioned vertical plane passes through the point of attachment of the strap 24. This structure assures that the fishing rod holder 10 will be balanced in a generally upright position when held by the strap 24, and it may be carried easily from fishing site to fishing site. Additionally, the pin 20 extends transversely across the annular wall 12 and forms substantially a 90° angle therewith, and the pin 20 is positioned whereby the aforementioned horizontal plane passes through the longitudinal axis thereof. This is a further critical relationship which assures the proper positioning of the butt end 17 of fishing rod 18, as is best seen in FIG. 5 in solid line, and in phantom line in FIGS. 1, 2 and 5.

The invention further provides a novel method of preparing the fishing rod holder of the invention. In practicing the method, a hollow elongated tube-like member 31 having a length sufficient to prepare a plurality of fishing rod holder blanks 42 is provided. The tube-like member 31 has a substantially uniform cross sectional area and a generally annular configuration throughout the length required to prepare the plurality of fishing rod holder blanks 42. Preferably, the tube-like member 31 has a circular cross sectional configuration, but it may be oval, rectangular, square and the like when desired. The tube-like member 31 is severed diagonally along a first diagonal plane 32 which forms approximately a 15° to 30° angle with a horizontal plane passing through the longitudinal axis thereof. The tube-like member 31 is also severed diagonally along a second diagonal plane 33 which is substantially parallel to the first diagonal plane 32, and which is sufficiently remote therefrom to form two of the fishing rod holder blanks identified as 34 and 35, respectively. The diagonal severing of the tube-like member 31 along the diagonal planes 32 and 33 forms elongated spike-like lower end portions 36 and 37, respectively, which are tapered outward at an angle of approximately 15° to 30° and adapted to be inserted into particulate material 29. The tube-like member 31 is cut longitudinally along a horizontal plane 38 which passes through the maximum diameter of tube-like member 31. The tube-like member 31 is cut along the horizontal plane 38 at a point intermediate the first and second diagonal planes 32 and 33, and for a distance sufficient to form first and second semi-annular supports 39 and 40, respectively, which are adapted to support the fishing rod 18. The first and second semi-annular supports 39 and 40 have terminal ends nearer the second and first diagonal planes 33 and 32, respectively. The first and second semi-annular supports 39 and 40 are severed adjacent their respective terminals ends to thereby form two blanks 34 and 35, respectively, for finishing into fishing rod holders 10.

The foregoing steps of cutting and severing the tube-like member 31 to form the blanks 34 and 35 are performed without regard to sequence. Thereafter the resultant blanks 34 and 35 are provided with a pin 20 and a carrying strap 24 following conventional prior art practices, such as by drilling openings 19 through annular wall 12 and positioning pin 20 therein, and drilling an opening 22 for strap 24 and attaching the same. The waste material 43 at either end of the tube-like member 31 is discarded.

The tube-like member 31 and the fishing rod holders 10 may be constructed of any suitable material, such as polyethylene, polypropylene, polyvinyl chloride, ABS and other plastics, and aluminum, magnesium, steel, alloys thereof, and other suitable metallic materials. The strap 24 is preferably formed of a durable plastic material such as polyethylene, polypropylene, polyvinyl chloride and nylon, or cords and ropes formed therefrom, but it also may be fabric, leather, and the like.

The term "particulate terrestrial material" is intended to embrace substances which are sufficiently loose to allow the spike-like lower end 14 to be inserted therein when fishing in either salt or fresh water. Normally, when fishing in salt water, the particulate terrestrial material is a sandy beach, or at least largely composed of sand and/or gravel. In instances where the fishing rod holder 10 is used in fresh water fishing, then the particulate terrestrial material may be an earthen shoreline, earthen embankment, and the like.

The fishing rod holder 10 is adaptable to a wide variety of prior art fishing rods presently used in surf fishing from a sandy beach, or in fishing from an earthen shoreline or embankment. It is capable of securely holding and tending a fishing rod in salt or fresh water fishing, and with little or no close attention from the fisherman. The foregoing is achieved by the unitary construction described herein which eliminates the possibility of losing one or more components during the frequent moves characteristic of a fishing trip. The fishing rod holder 10 is strong and durable, and yet it is relatively light and easily portable as the carrying strap 24 maintains the fishing rod holder 10 in a balanced upright position. Additionally, the fishing rod holder 10 may be easily constructed from a prior art elongated tube-like member and thus it is inexpensive to manufacture and may be sold at a reasonable cost.

The fishing rod holder 10 may be constructed in a variety of sizes to accomodate both salt water and fresh water fishing rods. As a general rule, small, medium and large sizes are adequate for most of the fishing rods presently in use. Very satisfactory small, medium and large sizes may have diameters for the intermediate tubular body 11 of 1.5, 2.0 and 2.0 inches, respectively; lengths for the spike-like lower ends 14 of 5.0, 6.5 and 6.5 inches, respectively; lengths for the intermediate tubular body portions 11 of 5.0, 9.5 and 9.5 inches, respectively; and lengths for the semi-annular supports 16 of 6.5, 10.0 and 18.0 inches, respectively. It is understood that these dimensions are merely by way of illustration only, and that either smaller or larger dimensions may be used when desired.

In FIGS. 5 and 6, the spike-like lower end portion 14 is shown inserted into particulate terrestrial material 29 to a depth sufficient to stabilize the fishing rod holder 10, but not sufficiently deep for the pin 20 to contact the surface 30 thereof. The butt end portion 17 extends upward from pin 20 and rests in semi-annular support 16. Thus the fishing rod 18 is supported by pin 20 above the surface 30 and remains clean and free of the particulate material 29.

The foregoing detailed discussion and the accompanying drawings are for purposes of illustration only, and are not intended to be limiting to the spirit or scope of the appended claims.

I claim:

1. A fishing rod holder consisting essentially of an elongated hollow tube-like member having a longitudinally extending axis, the said tube-like member being substantially straight and including an elongated generally axially aligned annular wall, the said annular wall having generally axially aligned first and second ends and first and second end portions respectively integrally formed therewith, the said annular wall embracing the elongated annular internal cavity within the said hollow tube-like member, the said first end portion being an integral generally axially aligned outward extension from the first end of the said annular wall and being tapered outward therefrom at an angle of approximately 15°–30° to form an elongated pointed first end portion which is adapted to be inserted into particulate terrestrial material and thereby stabilize the fishing rod holder when in use, the said second end portion being an integral generally axially aligned outward extension from the second end of the said annular wall and extending outward from one side thereof to thereby form an elongated semi-annular second end portion which is adapted to support a fishing rod when in use, the tapered said first end portion and the semi-annular said second end portion extending outward from the same longitudinally extending portion of the said annular wall whereby the concave internal surfaces thereof face in the same general direction and a vertical plane passing through the longitudinal axis of the said annular wall and bisecting the tapered said first end portion to form two longitudinally and outwardly extending substantially equal portions thereof also bisects the semi-annular said second end portion to form two longitudinally and outwardly extending substantially equal portions thereof, the said semi-annular second end portion being of a size and shape to loosely receive the butt end portion of a fishing rod while awaiting a strike and having a cross-sectional configuration such that the maximum width is between the longitudinally extending side edges thereof and whereby a fishing rod resting therein may be easily and rapidly pulled outward and backward therefrom when a fish strikes without being obstructed by the said longitudinally extending side edges, and stop means within the said internal cavity of the tube-like member for limiting the depth that the butt end of a fishing rod may be inserted therein, the said stop means being positioned adjacent the said semi-annular second end portion and sufficiently remote therefrom for the resultant portion of the said internal cavity between the said second end portion and the stop means to receive and retain the butt end of a fishing rod while awaiting a strike, the said portion of the internal cavity between the said second end portion and the stop means having an internal diameter between about 1.5 and 2 inches and a depth not greater than the internal diameter thereof, the said portion of the internal cavity between the said second end portion and the stop means being substantially larger than the diameter of the butt of the fishing rod whereby the terminal end thereof rests on the stop means and against the internal side of the annular wall remote from the semi-annular second end portion while in the fishing position awaiting a strike and is forced toward the internal side of the annular wall generally opposite thereto without binding when the fishing rod is moved quickly to the strike position.

2. The fishing rod holder of claim 1 wherein the said first end portion is tapered outward at an angle of about 20°.

3. The fishing rod holder of claim 1 wherein a carrying strap is provided, the said strap being attached substantially along the centerline of the said second end portion whereby the fishing rod holder tends to be balanced in the upright position when held by the strap and may be carried easily from fishing site to fishing site.

4. The fishing rod holder of claim 1 wherein the said tube-like member is circular in cross-section, the said annular wall is cylindrical in configuration, and the said longitudinally extending side edges of the semi-annular second end portion do not extend past a horizontal plane which passes through the longitudinal axis of the said annular wall and forms a 90° angle with the said vertical plane.

5. The fishing rod holder of claim 4 wherein the first end portion is tapered outward at an angle of about 20°.

6. The fishing rod holder of claim 4 wherein a carrying strap is provided, the said strap being attached to the said second portion, and the said vertical plane passing through the point of attachment of the strap whereby the fishing rod holder is balanced in a generally upright position when held by the strap and may be carried easily from fishing site to fishing site.

7. The fishing rod holder of claim 4 wherein the said stop means comprises a pin which extends transversely across the said annular wall and forms substantially a 90° angle therewith, and the said pin is positioned whereby the said horizontal plane passes through the longitudinal axis thereof.

8. The fishing rod holder of claim 4 wherein the first end portion is tapered outward at an angle of about 20°, wherein a carrying strap is provided, the said strap being attached near the outer end of the said second portion, and the said vertical plane passing through the point of attachment of the strap whereby the fishing rod holder is balanced in a generally upright position when held by the strap and may be carried easily from fishing site to fishing site, and wherein the said stop means comprises a pin which extends transversely across the said annular wall and forms substantially a 90° angle therewith, and the said pin is positioned whereby the said horizontal plane passes through the longitudinal axis thereof.

9. The fishing rod holder of claim 1 wherein the said internal cavity has a volume between the said stop means and the said first end portion which is sufficiently large to contain at least enough particulate terrestrial material to counterbalance the weight of a fishing rod when the fishing rod holder is in use and the said first end portion thereof is inserted into a body of particulate terrestrial material to a depth sufficient to stabilize the same at an angle suitable for supporting a fishing rod in the fishing position while awaiting a strike.

* * * * *